US009774213B2

(12) United States Patent
Ozaki

(10) Patent No.: US 9,774,213 B2
(45) Date of Patent: Sep. 26, 2017

(54) VEHICLE-MOUNTING STRUCTURE FOR WIRELESS POWER RECEPTION DEVICE

(71) Applicant: NISSAN MOTOR CO., LTD., Yakohama-shi, Kanagawa (JP)

(72) Inventor: Michio Ozaki, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/305,160

(22) PCT Filed: Apr. 23, 2014

(86) PCT No.: PCT/JP2014/061444
§ 371 (c)(1),
(2) Date: Oct. 19, 2016

(87) PCT Pub. No.: WO2015/162725
PCT Pub. Date: Oct. 29, 2015

(65) Prior Publication Data

US 2017/0040836 A1 Feb. 9, 2017

(51) Int. Cl.

| | |
|---|---|
| ***H02J 7/00*** | (2006.01) |
| ***H02J 7/02*** | (2016.01) |
| ***B60L 5/00*** | (2006.01) |
| ***B60L 11/18*** | (2006.01) |
| ***H01F 27/08*** | (2006.01) |

(Continued)

(52) U.S. Cl.
CPC ................ *H02J 7/025* (2013.01); *B60K 1/04* (2013.01); *B60L 5/00* (2013.01); *B60L 11/18* (2013.01); *H01F 27/08* (2013.01); *H01F 38/14* (2013.01); *B60K 2001/0438* (2013.01); *B60L 11/182* (2013.01); *Y02T 10/7005* (2013.01)

(58) Field of Classification Search
CPC ... H02J 7/025; B60K 1/04; B60L 5/00; B60L 11/18
USPC .................................................. 320/108, 109
See application file for complete search history.

(56) References Cited

U.S. PATENT DOCUMENTS 7,137,472 B2 * 11/2006 Aoki .................. B60R 21/0136 180/274
9,415,697 B2 * 8/2016 Asai ..................... B60L 11/182
(Continued)

FOREIGN PATENT DOCUMENTS

JP 10-109548 A 4/1998
JP 2005-306104 A 11/2005
(Continued)

*Primary Examiner* — M'Baye Diao
(74) *Attorney, Agent, or Firm* — Foley & Lardner LLP

(57) ABSTRACT

A vehicle-mounting structure for a wireless power reception device includes: a power-reception-side coil unit (23) including a power-reception-side coil (49) configured to wirelessly receive power transmitted from a power-supply-side coil; and a junction box (13) accommodating a rectifier (45) and mounted on a front part of the upper surface (23*a*) of the power-reception-side coil unit (23). A floor tunnel part (7) and the power-reception-side coil unit (23) form a closed-cross-section part (61), and the junction box (13) is accommodated in the closed-cross-section part (61). A rear part of the upper surface (23*a*) of the power-reception-side coil unit (23) is formed as an upward-airflow generation surface (47) configured to generate an upward airflow with heat of the power-reception-side coil (49).

3 Claims, 7 Drawing Sheets

1
RH
21
13
RR
19(17)
23
3
LH
FR

(51) Int. Cl.
*H01F 38/14* (2006.01)
*B60K 1/04* (2006.01)

(56) References Cited

U.S. PATENT DOCUMENTS

| | | | | |
|---|---|---|---|---|
| 9,502,908 | B2 * | 11/2016 | Ahn | H02J 50/80 |
| 9,539,908 | B2 * | 1/2017 | Asai | B60L 3/0023 |
| 9,566,851 | B2 * | 2/2017 | Kawamura | B60K 1/00 |
| 2008/0155985 | A1 * | 7/2008 | Labrador | F01K 27/00 60/698 |
| 2012/0299390 | A1 | 11/2012 | Kim et al. | |
| 2013/0193749 | A1 | 8/2013 | Nakamura et al. | |
| 2013/0300359 | A1 | 11/2013 | Nakamura et al. | |
| 2016/0236574 | A1 * | 8/2016 | Asai | B60K 1/04 |
| 2016/0243948 | A1 * | 8/2016 | Asai | H02M 7/44 |

FOREIGN PATENT DOCUMENTS

| | | | |
|---|---|---|---|
| JP | 2012-244722 | A | 12/2012 |
| JP | 2013-112047 | A | 6/2013 |
| JP | 2013-154815 | A | 8/2013 |
| JP | 2013-161942 | A | 8/2013 |
| WO | WO-2010/136863 | A1 | 12/2010 |
| WO | WO-2011/116394 | A1 | 9/2011 |
| WO | WO 2012/105040 | A1 | 8/2012 |
| WO | WO 2013/046366 | A1 | 4/2013 |

* cited by examiner 17
47
65
63
43(41)
15
45
7(5)
13(37)
35

VEHICLE-MOUNTING STRUCTURE FOR WIRELESS POWER RECEPTION DEVICE

TECHNICAL FIELD

The present invention relates to a vehicle-mounting structure for a wireless power reception device including a power-reception-side coil configured to wirelessly receive power transmitted from a power-supply-side coil.

BACKGROUND ART

A wireless charge device has heretofore been proposed which wirelessly charge a battery mounted on an electric vehicle such as an electric car by means of a power-reception-side coil unit provided to the vehicle and a power-supply-side coil unit provided on the ground (see Patent Literature 1 listed below). This power-reception-side coil unit described in Patent Literature 1 includes a coil accommodated in a case. Here, since the coil generates heat when energized, a cooling structure for cooling the coil is disclosed.

CITATION LIST

Patent Literature

Patent Literature 1: Japanese Patent Application Publication No. 2013-161942

SUMMARY OF INVENTION

Technical Problem

Meanwhile, in above Patent Literature 1, a cooling air path is provided which penetrates through the case of the coil unit, and this cooling air path is used to cool the coil. This leads to a problem in that the size of the coil unit is increased.

In view of this, an object of the present invention is to provide a vehicle-mounting structure for a wireless power reception device capable of suppressing increase in size of a coil unit.

Solution to Problem

In a vehicle-mounting structure for a wireless power reception device according to the present invention, an electric-component container is mounted on any one of a front side and a rear side of an upper surface of a power-reception-side coil unit including a power-reception-side coil in a vehicle front-rear direction. Also, a floor tunnel part of the vehicle and the power-reception-side coil unit form a closed-cross-section part in a front view of the vehicle, and the electric-component container is accommodated in the closed-cross-section part. In this way, a part of the upper surface of the power-reception-side coil unit corresponding to the power-reception-side coil in the power-reception-side coil unit is exposed, and this exposed part is formed as an upward-airflow generation surface configured to generate an upward airflow with heat of the power-reception-side coil.

Advantageous Effects of Invention

With the vehicle-mounting structure for a wireless power reception device according to the present invention, it is possible to suppress increase in size of the power-receptionside coil unit and also to reduce retention of heat inside the closed space formed in the closed-cross-section part by the floor tunnel part and the power-reception-side coil unit in a front view of the vehicle. This will be specifically described below.

First of all, on the upper surface of the power-reception-side coil unit, there are formed a part on which the electric component container is disposed, and the upward-airflow generation surface, at which a part corresponding to the power-reception-side coil is exposed. As the power-reception-side coil generates heat, the upward-airflow generation surface becomes hotter than the upper surface of the electric component container.

Then, as the power-reception-side coil generates heat, the upward-airflow generation surface generates heat as well, and air thus heated moves upward from the upward-airflow generation surface until reaching the floor tunnel part.

Here, since the air keeps rising and hits the floor tunnel part at a region above the upward-airflow generation surface, the air pressure is higher there than at a region above the electric component container. That is, an air-pressure gradient is formed over the power-reception-side coil unit by the higher-pressure region above the upward-airflow generation surface and the lower-pressure region above the electric component container.

Thus, after moving upward from the upward-airflow generation surface, the air changes the direction of its flow toward the region above the electric component container, at which the air pressure is lower, and flows inside the floor tunnel part in the vehicle front-rear direction through the region above the electric component container.

As described above, as the power-reception-side coil generates heat, hot air rises from the upward-airflow generation surface, then passes through the region above the electric component container with natural convection, and is discharged to the outside of the vehicle. In this way, it is possible to suppress retention of heat inside the floor tunnel part.

DESCRIPTION OF EMBODIMENTS

A mode for carrying out the present invention will be described below in detail with reference to the drawings. Note that, in the following, the front side of a vehicle, the rear side of the vehicle, the right-hand side of the vehicle, and the left-hand side of the vehicle will be denoted as FR, RR, RH, and LH, respectively.

Figure 1:
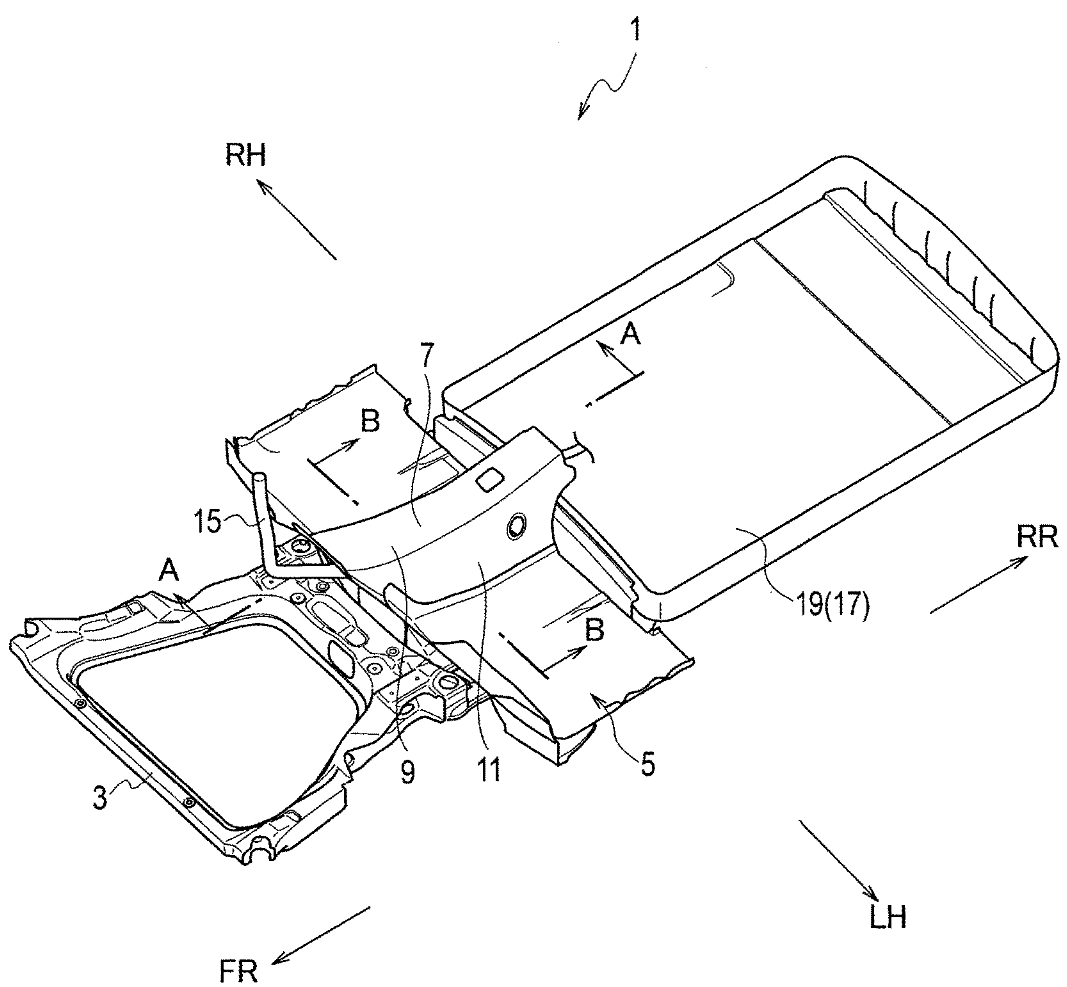
FIG. 1 is a perspective view of a lower part of a vehicle body including a vehicle-mounting structure for a wireless power reception device according to an embodiment of the present invention.

As shown in FIG. 1, a front compartment is formed at a front part of a vehicle body 1, and a sub frame 3 is arranged at a lower part of the front compartment. The sub frame 3 is formed in a rectangular shape in a plan view, and a motor unit not shown that serves as the vehicle's drive source is attached to the sub frame 3 through mount members.

Figure 3:
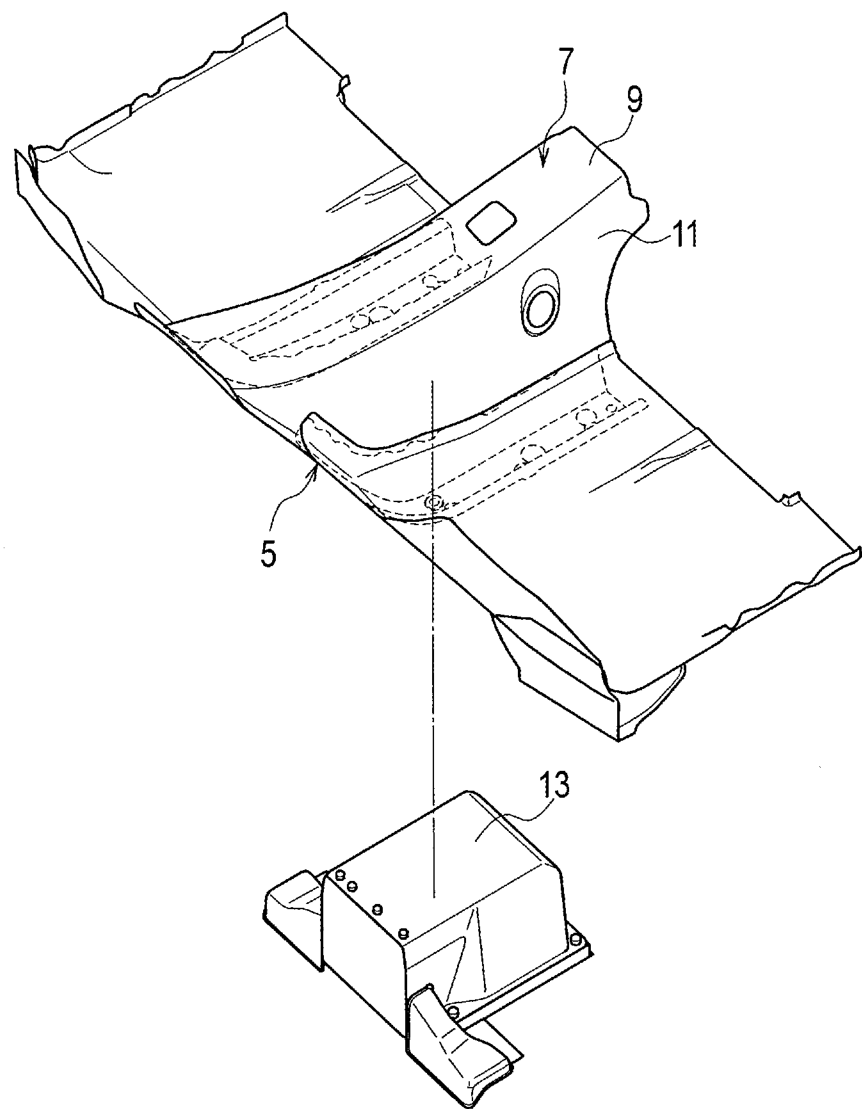
FIG. 3 is an exploded perspective view showing the front floor panel, shown in FIG. 1, and a junction box attached under the front floor panel.

A cabin is provided behind the front compartment in the vehicle. Between the front compartment and the cabin, a dash panel not shown is arranged which extends upward from the front end of a front floor panel 5. Also, as shown in FIGS. 1 and 3, at the center of the front floor panel 5 in the vehicle width direction, a floor tunnel part 7 formed in an upwardly-protruding hat shape extends in the front-rear direction. Specifically, the floor tunnel part 7 includes an upper surface 9 at the top and a pair of left and right side surfaces 11, 11 extending downward from the left and right ends of the upper surface 9. A junction box 13 (electric-component container) is arranged in this floor tunnel part 7 from below. Also, a wire harness 15 of a high-electricity system configured to transmit power from a later-described battery to a motor unit extends along the front-rear direction. The wire harness 15 is routed through the inside of the floor tunnel part 7.

A rear floor panel not shown is joined to the rear side of the front floor panel 5 in the vehicle, and a battery case 17 accommodating the battery is disposed under the rear floor panel. Note that the battery case 17 in FIG. 1 represents a lower case 19, and the opening at the top of this lower case is closed by an upper case not shown.

Figure 2:
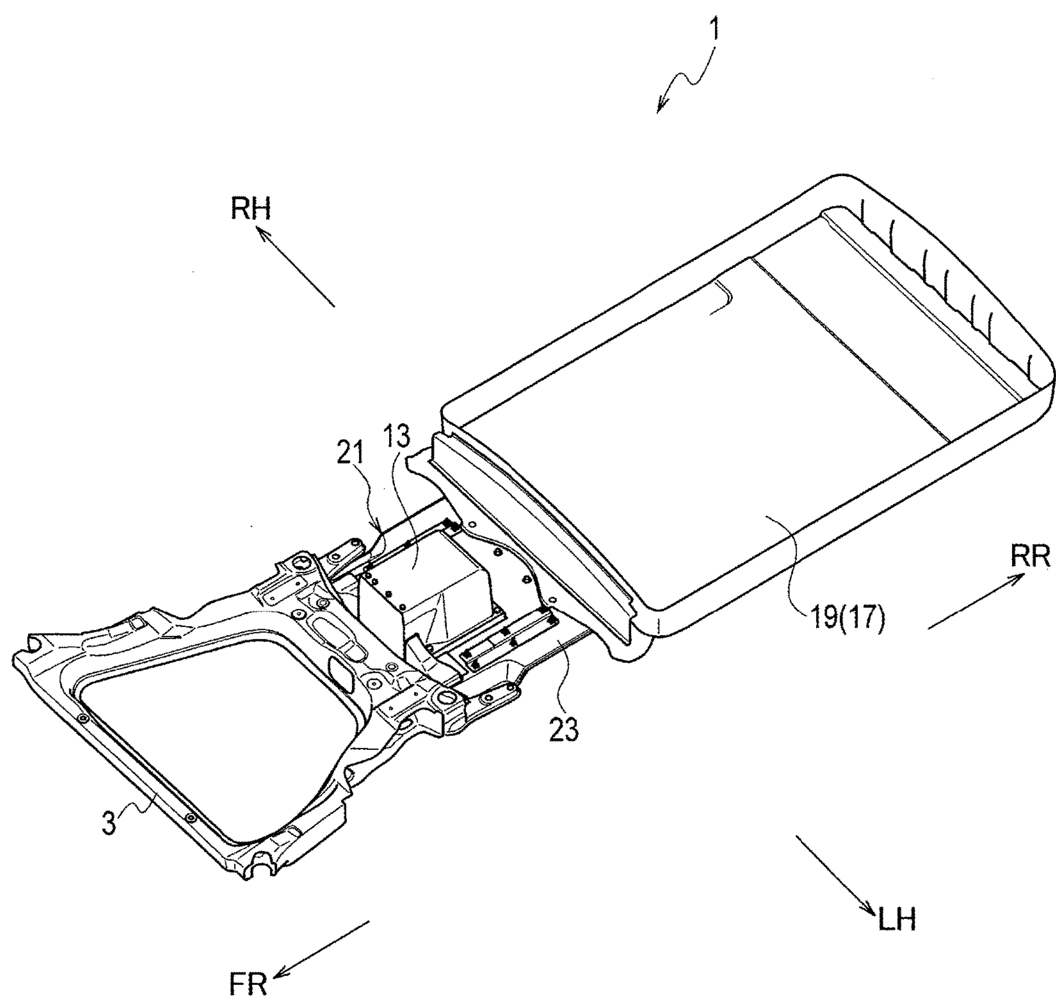
FIG. 2 is a perspective view showing a state where a front floor panel is removed from FIG. 1.
Figure 4:
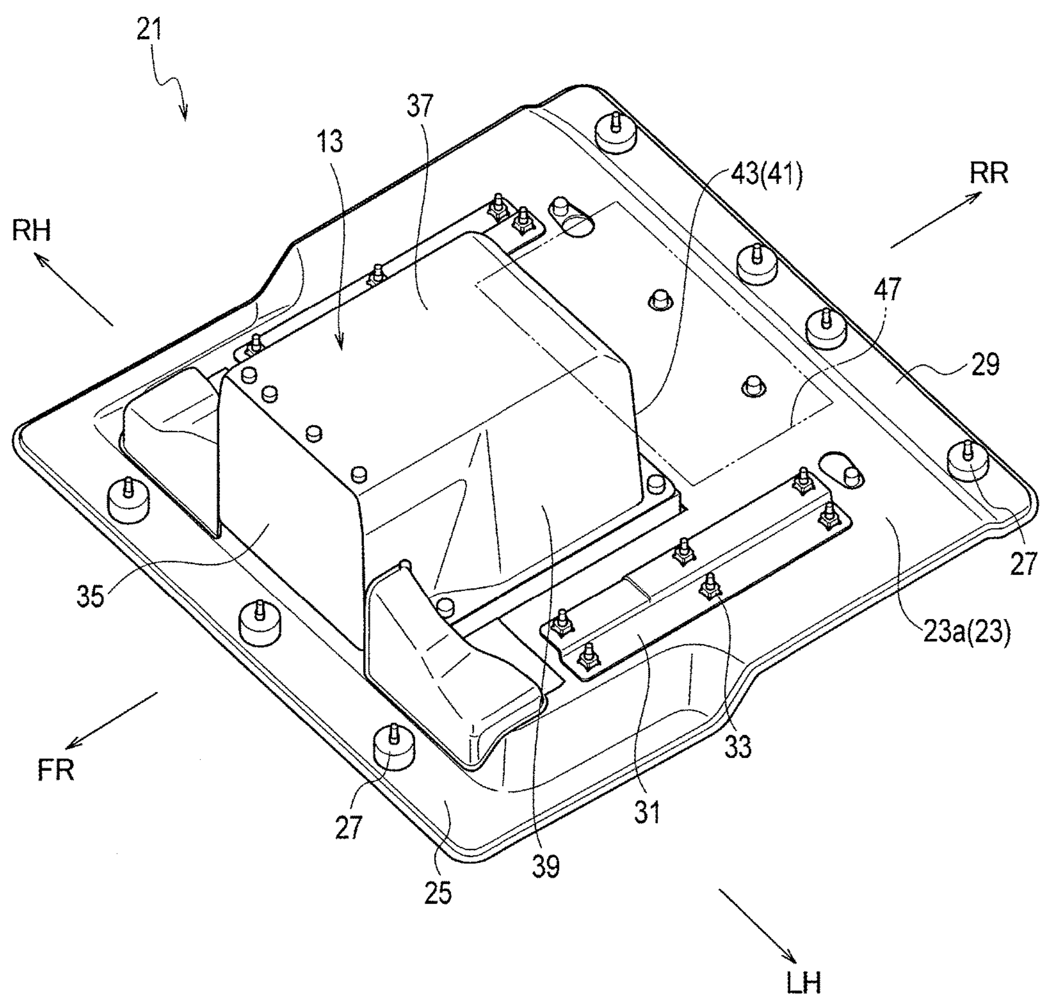
FIG. 4 is a perspective view showing the wireless power reception device according to the embodiment of the present invention.

As shown in FIG. 2, a wireless power reception device 21 according to this embodiment is arranged between the sub frame 3 and the battery case 17. This wireless power reception device 21 is configured to charge the battery mounted on the vehicle by wirelessly receiving power supplied from a power supply device installed at a power supply station not shown or the like. Specifically, as shown in FIG. 4, the wireless power reception device 21 includes a power-reception-side coil unit 23 disposed on a lower side and formed in a rectangular plate shape in a plan view, and the junction box 13 (electric-component container), attached to a front side of an upper surface 23*a* of the power-reception-side coil unit 23. Note that the above-mentioned battery is electrically connected to a later-described power-reception-side coil 49 and is configured to store power transmitted from a power-supply-side coil of the power supply device.

As shown in FIGS. 2 and 4, a front attachment surface 25 is formed on a front end portion of the power-reception-side coil unit 23. The front attachment surface 25 is coupled to the lower surface of the rear end of the sub frame 3 with bolts through disk-shaped protrusions 27 protruding upward. Also, a rear attachment surface 29 is formed on a rear end portion. The rear attachment surface 29 is fastened to the lower surface of the front end of the battery case 17 with bolts through disk-shaped protrusions 27 protruding upward. Also, a pair of attachment brackets 31 extending in the front-rear direction are joined to the left and right sides of the power-reception-side coil unit 23. Bolts 33 are screwed through the attachment brackets 31, the bolts 33 projecting upward.

Figure 5:
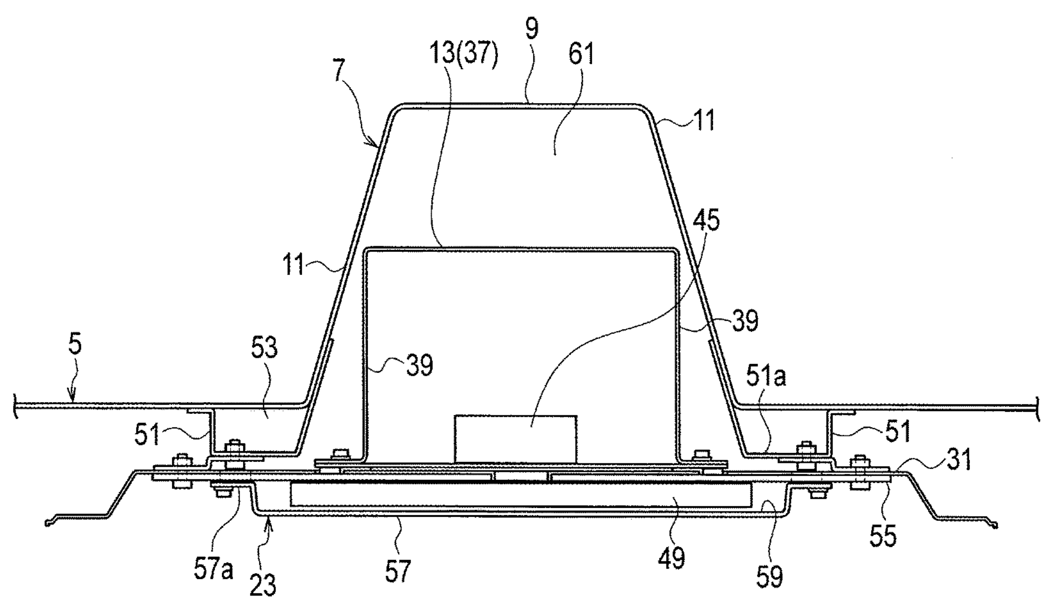
FIG. 5 is a cross-sectional view taken along line B-B in FIG. 1.
Figure 6:
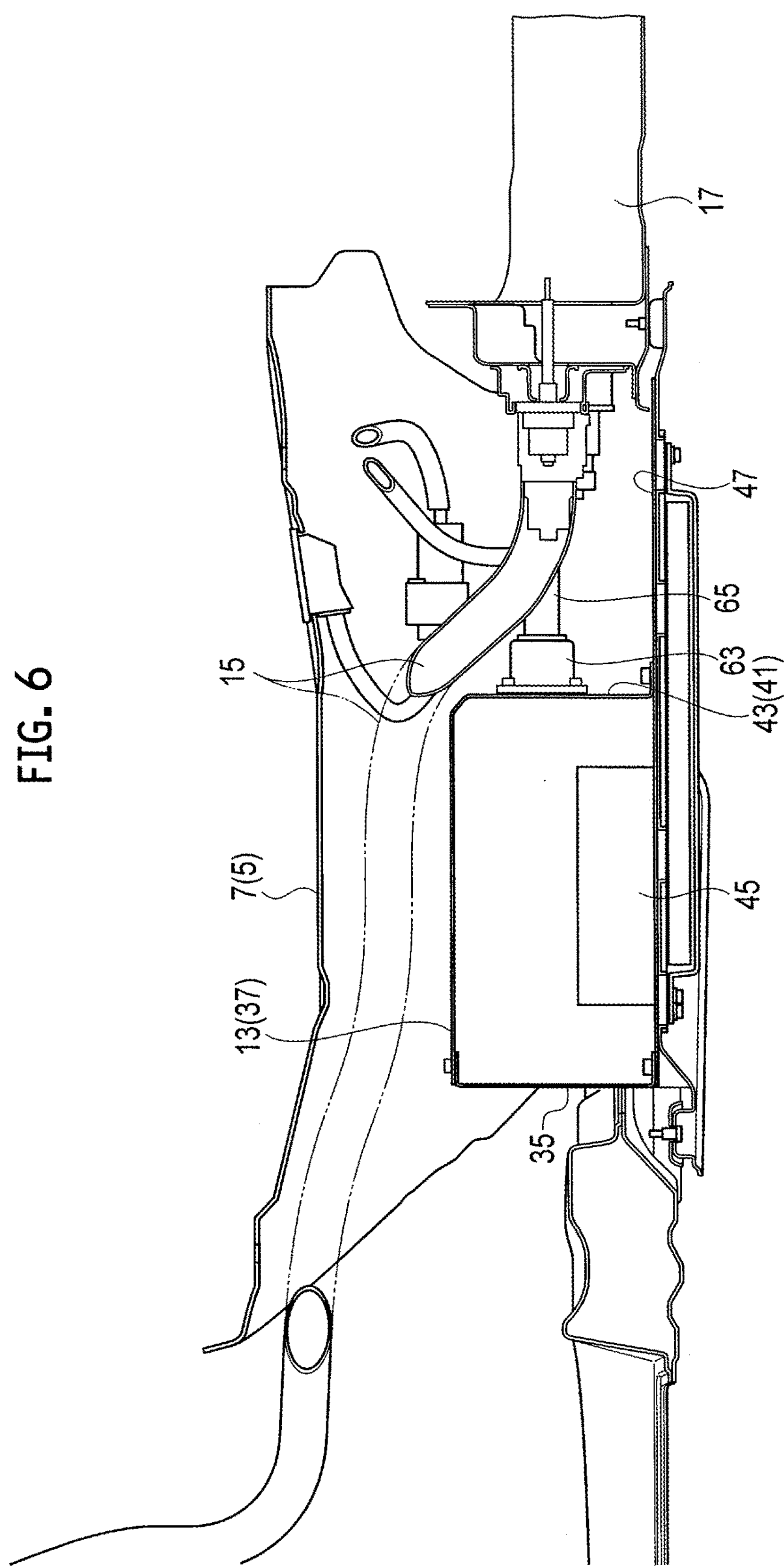
FIG. 6 is a cross-sectional view taken along line A-A in FIG. 1.

As shown in FIGS. 4 to 6, the junction box 13 (electric-component container) is formed in a cuboidal shape. Specifically, it includes a front wall 35 disposed toward the front side of the vehicle, an upper wall 37 disposed at the top, a pair of side walls 39, 39 disposed on the left and right sides, and a rear wall 41 disposed toward the rear side of the vehicle. Here, the rear wall 41 is formed as a vertical wall part 43 extending substantially vertically in the up-down direction.

As shown in FIG. 4, the junction box 13 is mounted on the front side of the upper surface 23*a* of the power-reception-side coil unit 23. As shown in FIGS. 5 and 6, at least a rectifier 45 (electric component) is accommodated in the junction box 13. Moreover, a rear side (shown by a two-dot chain line) where the junction box 13 is not mounted is formed as an upward-airflow generation surface 47 having a rectangular shape in a plan view. Thus, of the front part and the rear part of the upper surface 23*a* of the power-reception-side coil unit 23, the part on which the junction box 13 is not mounted is formed as the upward-airflow generation surface 47, which is configured to generate an upward airflow with the heat of the power-reception-side coil 49.

Here, as shown in FIG. 5, the power-reception-side coil 49 is accommodated in the power-reception-side coil unit 23. As the power-reception-side coil 49 generates heat, the upward-airflow generation surface 47 is heated as well, so that air 67 thus heated rises upward from the upward-airflow generation surface 47. Consequently, heat is dissipated from the power-reception-side coil unit 23.

As shown in FIG. 5, lower end portions of the floor tunnel part 7 on the left and right sides include tunnel members 51 opening at the top. When joined to the front floor panel 5, the tunnel members 51 form closed cross sections 53. Moreover, the power-reception-side coil unit 23 is disposed under the floor tunnel part 7.

As shown in FIG. 5, this power-reception-side coil unit 23 includes: a coil base 55 having a flat plate shape; the power-reception-side coil 49, coupled to the lower surface of the coil base 55; and a coil cover 57 disposed under the coil base 55 and the power-reception-side coil 49. The coil cover 57 includes a recess 59 making a center part thereof recessed downward from a peripheral part 57*a*. The power-reception-side coil unit 23 is formed by fastening the peripheral part 57*a* of the coil cover 57 to the coil base 55. The power-reception-side coil 49 generates heat by wirelessly receiving power transmitted from the power-supply-side coil.

Also, the attachment brackets 31 of the power-reception-side coil unit 23 are fastened to bottom surfaces 51*a* of the tunnel members, which are part of the floor tunnel part 7, with some of the bolts 33. Thus, the floor tunnel part 7 and the power-reception-side coil unit 23 form a closed-cross-section part 61. Moreover, the junction box 13 is attached to the upper surface 23*a* of the power-reception-side coil unit 23. Hence, the junction box 13 is accommodated in the closed-cross-section part 61, formed by the floor tunnel part 7 and the power-reception-side coil unit 23.

Also, as shown in FIG. 6, the battery is disposed on the opposite side of the upward-airflow generation surface 47 from the junction box 13 in the vehicle front-rear direction. Specifically, the battery case 17 is disposed rearward of the upward-airflow generation surface 47. That is, the junction box 13 and the battery case 17 are disposed away from each other in the front-rear direction by the length of the upward-airflow generation surface 47. Moreover, a harness connection part 63 is arranged on the rear wall 41 (vertical wall part 43) of the junction box 13. A wire harness 65 extending from the battery in the battery case 17 is connected to this harness connection part 63. Also, the wire harness 15 of the high-electricity system, routed from the motor unit at the front part of the vehicle, is connected to the front surface of the battery case 17.

Figure 7:
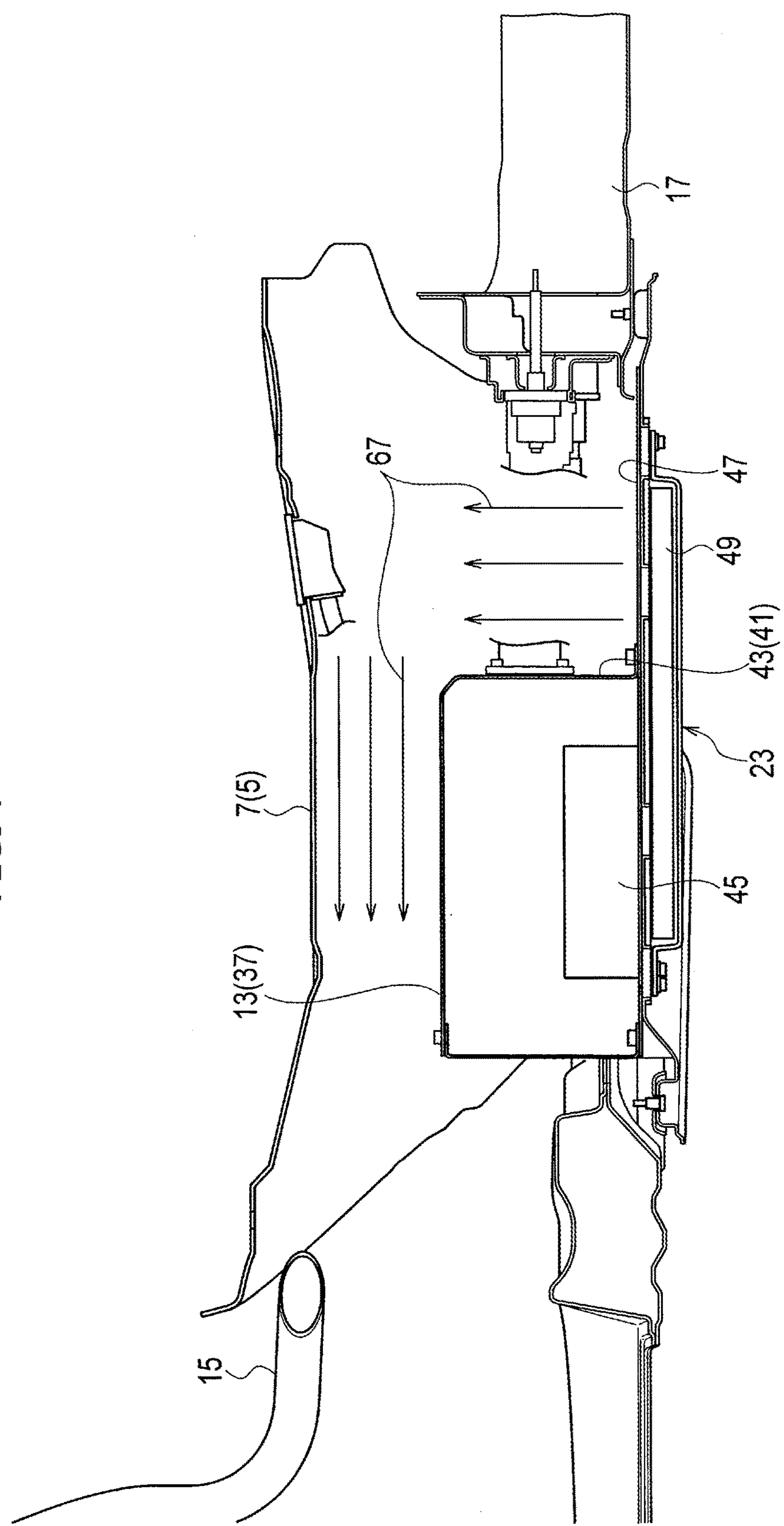
FIG. 7 is a cross-sectional view showing the flow of air around the wireless power reception device and corresponds to FIG. 6.

The flow of the air 67 around the power-reception-side coil unit 23 will be described below with reference to FIG. 7.

First of all, on the upper surface of the power-reception-side coil unit 23, there are formed a part on which the junction box 13 is disposed, and the upward-airflow generation surface 47, at which a part corresponding to the power-reception-side coil 49 is exposed. As the power-reception-side coil 49 generates heat, the upward-airflow generation surface 47 becomes hotter than the upper surface of the junction box 13.

Then, as the power-reception-side coil 49 generates heat, the upward-airflow generation surface 47 generates heat as well, and the air 67 thus heated moves upward from the upward-airflow generation surface 47 until reaching the floor tunnel part 7.

Here, since the air 67 keeps rising and hits the floor tunnel part 7 at a region above the upward-airflow generation surface 47, the air pressure is higher there than at a region above the junction box 13. That is, an air-pressure gradient is formed over the power-reception-side coil unit 23 by the higher-pressure region above the upward-airflow generation surface 47 and the lower-pressure region above the junction box 13.

Thus, after moving upward from the upward-airflow generation surface 47, the air 67 changes the direction of its flow toward the region above the junction box 13, at which the air pressure is lower, as indicated by arrows, and flows inside the floor tunnel part 7 toward the front side of the vehicle through the region above the junction box 13 with natural convection.

As described above, as the power-reception-side coil 49 generates heat, the hot air 67 rises from the upward-airflow generation surface 47, then passes through the region above the junction box 13 with natural convection, and is discharged from the motor room to the outside of the vehicle.

Advantageous effects by this embodiment will be described below.

(1) The vehicle-mounting structure for a wireless power reception device according to this embodiment includes: the power-reception-side coil unit 23, arranged under the floor tunnel part 7 of the vehicle and including the power-reception-side coil 49, configured to wirelessly receive power transmitted from the power-supply-side coil; and a junction box 13 (electric-component container), accommodating the rectifier 45 (electric component) and mounted on the front side of the upper surface of the power-reception-side coil unit 23 in the vehicle front-rear direction. The floor tunnel part 7 and the power-reception-side coil unit form the closed-cross-section part 61 in a front view of the vehicle, and the junction box 13 is accommodated in the closed-cross-section part 61. Also, the junction box 13 is disposed on the front side of the upper surface 23*a* of the power-reception-side coil unit 23 in the vehicle front-rear direction, thereby exposing a part of the upper surface 23*a* of the power-reception-side coil unit corresponding to the power-reception-side coil 49 to form the upward-airflow generation surface 47, configured to generate an upward airflow with the heat of the power-reception-side coil 49.

In this way, although the junction box 13 is mounted on the upper surface 23*a* of the power-reception-side coil unit 23, the upward airflow generated from the power-reception-side coil unit 23 can be moved upward from the upward-airflow generation surface 47 and then released to the outside of the vehicle through the region above the junction box 13.

Specifically, since the air 67 keeps rising and hits the floor tunnel part 7 at the region above the upward-airflow generation surface 47, the air pressure is higher there than at the region above the junction box 13. That is, an air-pressure gradient is formed over the power-reception-side coil unit 23 by the higher-pressure region above the upward-airflow generation surface 47 and the lower-pressure region above the junction box 13.

Thus, after moving upward from the upward-airflow generation surface 47, the hot air 67 changes the direction of its flow toward the region above the junction box 13, at which the air pressure is lower, and flows inside the floor tunnel part 7 toward the front side of the vehicle through the region above the junction box 13 with natural convection.

By using natural convection to dissipate heat from the power-reception-side coil unit 23, disposed in the closed-cross-section part 61, in this manner, the heat does not stay inside the closed-cross-section part 61. Hence, the power-reception-side coil unit 23 downsized can suppress increase in temperature of the power-reception-side coil 49.

(2) Either in front of or behind the power-reception-side coil unit 23 in the vehicle front-rear direction, the battery (battery case 17) is disposed on the rear side around which the junction box 13 is not disposed, the battery (battery case 17) being electrically connected to the power-reception-side coil 49 and configured to store power transmitted from the power-supply-side coil.

In this way, a space is defined above the upward-airflow generation surface 47. Thus, this space can be utilized to route a vehicle component such as the wire harness 15 of the high-electricity system.

(3) The side surface of the junction box 13 on the upward-airflow generation surface 47 side is formed as the vertical wall part 43, and the harness connection part 63, to which to connect the wire harness 65, extending from the battery, is provided to the vertical wall part 43.

Since the side surface of the junction box 13 is the vertical wall part 43 as described above, the work of connecting the wire harness 65 from the battery to the harness connection part 63 is done efficiently. Also, in a comparison between the vertical wall part 43 and an oblique wall part extending obliquely, the area of the upward-airflow generation surface 47 can be larger with the vertical wall part 43, and the efficiency of heat dissipation of the power-reception-side coil unit 23 is accordingly better.

Although an embodiment of the present invention has been described above, this embodiment is mere illustration of an example described to facilitate the understanding of the present invention. The present invention is not limited to the embodiment. The technical scope of the present invention is not limited to the specific technical matters disclosed in the embodiment, but includes various modifications, changes, alternative techniques, and the like that can be easily derived therefrom.

For example, in the embodiment, the rear side of the upper surface 23*a* of the power-reception-side coil unit 23 is set as the upward-airflow generation surface 47; however, the junction box 13 may be mounted on the rear side of the upper surface 23*a* of the power-reception-side coil unit 23, the upward-airflow generation surface 47 may be set on the front side, and the battery case 17 may be disposed forward of the upward-airflow generation surface 47.

INDUSTRIAL APPLICABILITY

The present invention is applicable to a vehicle-mounting structure for a wireless power reception device including a power-reception-side coil configured to wirelessly receive power transmitted from a power-supply-side coil.

REFERENCE SIGNS LIST

1 vehicle body
7 floor tunnel part
13 junction box (electric-component container)
23 power-reception-side coil unit
23*a* upper surface
43 vertical wall part
45 rectifier (electric component)
47 upward-airflow generation surface
49 power-reception-side coil
61 closed-cross-section part
63 harness connection part
65 wire harness

The invention claimed is:

1. A vehicle-mounting structure for a wireless power reception device, the vehicle-mounting structure comprising:

a power-reception-side coil unit arranged under a floor tunnel part of a vehicle and including a power-reception-side coil configured to wirelessly receive power transmitted from a power-supply-side coil; and an electric-component container accommodating an electric component and mounted on a front side or a rear side of an upper surface of the power-reception-side coil unit in a vehicle front-rear direction, wherein the floor tunnel part and the power-reception-side coil unit form a closed-cross-section part in a front view of the vehicle, and the electric-component container is accommodated in the closed-cross-section part, the electric-component container is disposed on any one of the front side and the rear side of the upper surface of the power-reception-side coil unit in the vehicle front-rear direction, thereby exposing a part of the upper surface of the power-reception-side coil unit corresponding to the power-reception-side coil to form an upward-airflow generation surface configured to generate an upward airflow with heat of the power-reception-side coil.

2. The vehicle-mounting structure for a wireless power reception device according to claim 1, wherein, either in front of or behind the power-reception-side coil unit in the vehicle front-rear direction, a battery is disposed on a side around which the electric-component container is not disposed, the battery being electrically connected to the power-reception-side coil and configured to store power transmitted from the power-supply-side coil.

3. The vehicle-mounting structure for a wireless power reception device according to claim 2, wherein a side surface of the electric-component container on the upward-airflow generation surface side is formed as a vertical wall part, and a harness connection part to which to connect a harness extending from the battery is provided to the vertical wall part.

* * * * *